(12) United States Patent
Park et al.

(10) Patent No.: US 9,733,099 B2
(45) Date of Patent: Aug. 15, 2017

(54) ELECTRONIC DEVICE AND OPERATION METHOD THEREOF

(75) Inventors: Gyuhyeon Park, Seoul (KR); Kyunam Lee, Incheon-si (KR); Mihwa Ahn, Gyeonggi-do (KR); Changjin Choi, Seoul (KR)

(73) Assignee: THINKWARESYSTEMS CORP., Seoul (KR)

( * ) Notice: Subject to any disclaimer, the term of this patent is extended or adjusted under 35 U.S.C. 154(b) by 907 days.

(21) Appl. No.: 14/117,151

(22) PCT Filed: Apr. 3, 2012

(86) PCT No.: PCT/KR2012/002482
§ 371 (c)(1),
(2), (4) Date: Mar. 19, 2015

(87) PCT Pub. No.: WO2012/153916
PCT Pub. Date: Nov. 15, 2012

(65) Prior Publication Data
US 2015/0185035 A1 Jul. 2, 2015

(30) Foreign Application Priority Data
May 11, 2011 (KR) .......... 10-2011-0043776

(51) Int. Cl.
*G01C 21/34* (2006.01)
*G01C 21/36* (2006.01)
*G08G 1/0968* (2006.01)

(52) U.S. Cl.
CPC ..... *G01C 21/3492* (2013.01); *G01C 21/3694* (2013.01); *G08G 1/096827* (2013.01); *G08G 1/096844* (2013.01); *G08G 1/096883* (2013.01); *G08G 1/096888* (2013.01)

(58) Field of Classification Search
None
See application file for complete search history.

(56) References Cited

U.S. PATENT DOCUMENTS

| | | | | |
|---|---|---|---|---|
| 6,480,783 B1* | 11/2002 | Myr | ............... | G01C 21/3492 340/990 |
| 7,720,630 B1* | 5/2010 | Miller | ............... | G01C 23/00 702/150 |
| 2004/0225437 A1* | 11/2004 | Endo | ............... | G01C 21/34 701/415 |
| 2004/0249568 A1* | 12/2004 | Endo | ............... | G01C 21/3492 701/410 |
| 2005/0206534 A1* | 9/2005 | Yamane | ............... | G08G 1/0104 340/994 |

(Continued)

FOREIGN PATENT DOCUMENTS

| | | |
|---|---|---|
| KR | 10-2005-0015912 | 2/2005 |
| KR | 10-2006-0037481 | 5/2006 |

(Continued)

*Primary Examiner* — Russell Frejd
(74) *Attorney, Agent, or Firm* — Novick, Kim & Lee, PLLC; Sang Ho Lee

(57) ABSTRACT

The present disclosure provides an electronic device and operating method of the electronic device reflecting real traffic situation more precisely, by navigating a path in consideration of both real-time traffic information and statistical traffic information.

26 Claims, 13 Drawing Sheets

(56) References Cited

U.S. PATENT DOCUMENTS

| | | | | |
|---|---|---|---|---|
| 2009/0164114 A1* | 6/2009 | Morikawa | .......... | G01C 21/3492 |
| | | | | 701/532 |
| 2010/0004903 A1* | 1/2010 | Fargas | .................... | G06T 17/05 |
| | | | | 703/1 |
| 2011/0313633 A1* | 12/2011 | Nath | ...................... | G08G 1/163 |
| | | | | 701/70 |
| 2011/0313654 A1* | 12/2011 | Olson | ................ | G01C 21/3415 |
| | | | | 701/516 |

FOREIGN PATENT DOCUMENTS

| KR | 10-2007-0115266 | 12/2007 |
|---|---|---|
| KR | 10-2010-0037368 | 4/2010 |

\* cited by examiner

FIG. 2

STATISTICAL TRAFFIC INFORMATION DATABASE(DB)

| LOCATION INFO. (ig. link ID) | WEATHER CONDITION | DAY'S ATTRIBUTE CONDITIONS | TIME PERIOD CONDITIONS | STATISTICAL VALUES |
|---|---|---|---|---|
| **** | SERENITY | A WEEKDAY | 0:00 ~ 00:30 | MOVING TIME : *** <br> MOVING SPEED : *** <br> CONGESTION : *** |
| **** | CLOUD | DAY BEFORE A HOLIDAY | | |
| **** | RAIN | DAY AFTER A HOLIDAY | 00:30 ~ 01:00 | MOVING TIME : *** <br> MOVING SPEED : *** <br> CONGESTION : *** |
| | HEAVY RAIN | A HOLIDAY | | |
| ⋮ | SNOW | DAY BEFORE HOLIDAYS | ⋮ | |
| | HEAVY SNOW | DAY AFTER HOLIDAYS | | |
| **** | ⋮ | FIRST DAY OF HOLIDAYS | 23:30 ~ 24:00 | MOVING TIME : *** <br> MOVING SPEED : *** <br> CONGESTION : *** |
| ⋮ | | LAST DAY OF HOLIDAYS | | |

REAL TIME TRAFFIC INFORMATION

FIG. 9

REAL-TIME TRAFFIC INFORMATION AT STARTING-TIME POINT

| MANAGEMENT INFORMATION | LOCATION INFORMATION | EVENT INFORMATION |
|---|---|---|
| 09:00AM | LINK ID 1 | MOVING SPEED : 60 Km/h<br>MOVING TIME : 30 min<br>ACCIDENT INFORMATION : NONE |
| 09:00AM | LINK ID 2 | MOVING SPEED : 10 Km/h<br>MOVING TIME : 90 min<br>ACCIDENT INFORMATION : NONE |

(a)

MAP DATA

| LOCATION INFORMATION | BASIC SPEED |
|---|---|
| LINK ID 1 | 80Km/h |
| LINK ID 2 | 60Km/h |

(b)

STATISTICAL TRAFFIC INFORMATION AT ESTIMATED ENTERING TIME OF THE SECOND SECTION

| LOCATION INFORMATION | WEATHER CONDITION | DAY'S ATTRIBUTE CONDITIONS | TIME PERIOD CONDITIONS | STATISTICAL VALUES | |
|---|---|---|---|---|---|
| LINK ID 3 | RAIN | WEEKDAY | 09:30 ~ 10:00AM | AVERAGE MOVING SPEED | :40 Km/h |
| | | | | AVERAGE MOVING TIME | :30 min |
| LINK ID 4 | RAIN | WEEKDAY | 09:30 ~ 10:00AM | AVERAGE MOVING SPEED | :20 Km/h |
| | | | | AVERAGE MOVING TIME | :60 min |

ELECTRONIC DEVICE AND OPERATION METHOD THEREOF

CROSS REFERENCE TO RELATED APPLICATION

This application is the national phase under 35 USC 371 of international application no. PCT/KR2012/002482, filed Apr. 3, 2012, which claims the benefit of the priority date of Korean application no. 10-2011-0043776, filed May 11, 2011. The contents of the aforementioned applications are incorporated herein in their entirety.

TECHNICAL FIELD

The present disclosure relates to an electronic device and its operating method for navigating a path to the destination. More particularly, the present disclosure relates to an electronic device and its operating method for navigating a path to the destination based on real-time traffic information and statistical traffic information.

BACKGROUND ART

As Internet network is opened to the public and laws concerning location information are modified, LBS (Location Based Service) related industries are being vitalized. As a field of LBS services, a vehicle navigation related industry for positioning current position of a device-installed vehicle or navigating a path to the destination is also being rapidly vitalized.

By the way, the conventional navigations have a problem in that they navigate incorrect smallest time-consuming paths, because they are not able to reflect real traffic situation precisely in order to navigate a path to the destination.

DISCLOSURE OF THE INVENTION

Technical Problem

An embodiment of the present disclosure is providing an electronic device and an operating method of an electronic device for navigating a path in consideration of both real-time traffic information and statistical traffic information.

Another embodiment of the present disclosure is providing an electronic device and an operating method of an electronic device for navigating a path by reflecting accident information.

Technical tasks of the present disclosure are not limited to the above-mentioned embodiments. Other technical tasks which are not mentioned may be clearly understandable for persons who skilled in the art of the present disclosure from the following description.

Technical Solution

An electronic device according to a first aspect of the present disclosure is configured to include: an output unit; and a control unit for providing a path from a starting point to a destination through the output unit by considering real-time traffic information about a first section starting from a starting point, and by considering statistical traffic information about a second section after the first section to the destination.

An operating method of an electronic device according to a second aspect of the present disclosure is configured to include: receiving a starting point and a destination; and providing a path from the starting point to the destination through an output unit, by considering real-time traffic information about a first section starting from the starting point, and considering statistical traffic information about a second section after the first section to the destination.

Advantageous Effects

According to an embodiment of the present disclosure, a smallest time-consuming path may be provided by configuring a path to the destination in consideration of real-time traffic information and statistical traffic information.

According to another embodiment of the present disclosure, for configuring a path to the destination in consideration of real-time traffic information and statistical traffic information, a more precise route guiding information may be provided by further considering accident information.

BRIEF DESCRIPTION OF THE DRAWINGS

FIG. 2 illustrates real-time traffic information according to an embodiment of the present disclosure.

FIG. 9 illustrates an example of real-time traffic information and statistical traffic information for a first section according to an embodiment of the present disclosure.

MODE FOR CARRYING OUT THE INVENTION

Objects, features, and advantages of the present disclosure will be more clearly described in the following description related to the drawings. However, because the present disclosure may have various alterations and embodiments, hereinafter some particular embodiments will be illustrated in drawings and described in detail. In addition, in case of determining that a detailed description about known function or structure relating to the present disclosure may evade the main point of the present disclosure, the detailed description may be omitted. Also, numbers used for describing the present disclosure (e.g., 1, one) are no more than identification symbols used in order to separate a component from another component.

As well, the terms for the components used in the following descriptions, "module" and "unit" are named or combined considering only easier drafting of the disclosure. Therefore, the terms do not have any distinctive meanings or functions by themselves.

Figure 1:
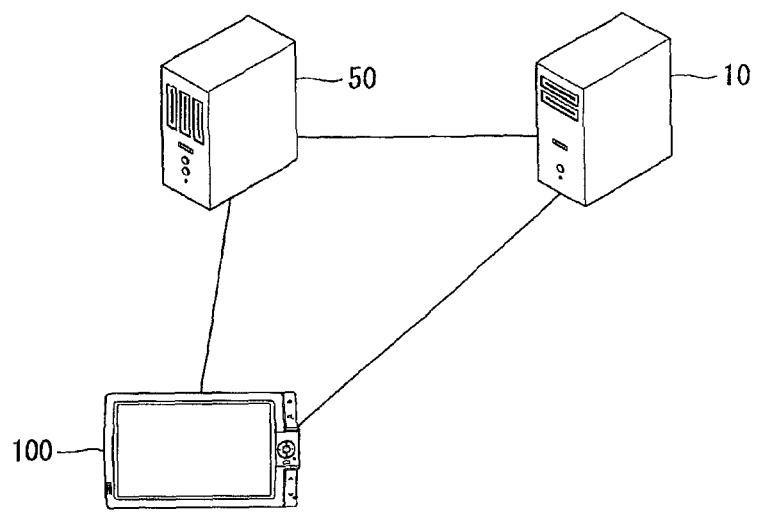
FIG. 1 illustrates a system environment according to an embodiment of the present disclosure.

FIG. 1 illustrates a system environment according to an embodiment of the present disclosure.

According to an embodiment of the present disclosure, the system environment may include at least one of a real-time traffic information server 10, a statistical traffic information server 50, and a navigation 100.

The navigation 100 may navigate an optimum path based on information provided from at least one of the real-time traffic information server 10 and the statistical traffic information server 50. Hereinafter, each of the components will be described in detail.

The real-time traffic information server 10 may collect various kinds of real-time information. The real-time information is the information reflecting current traffic condition. The real-time traffic information server 10 may obtain real-time traffic information from, for example, a prove car, a server, an operator input, etc.

The real-time traffic information server 10 may re-configure the obtained real-time traffic information into a pre-determined standard such as TPEG (Transport Protocol Expert Group). The real-time traffic information may include various kinds of information in order to reflect current traffic condition. The various kinds of information will be described in detail with reference to FIG. 2.

FIG. 2 illustrates real-time traffic information according to an embodiment of the present disclosure.

Referring to FIG. 2, the real-time traffic information may include at least one of management information, location information, and event information. Each of the information will be specifically described in the following.

The management information included in the real-time information may include at least one of creation date and creation time of the corresponding real-time traffic information. For example, if the management information includes a piece of information such as 2011.03.08. 11:00 PM, then it may mean that the corresponding real-time traffic information is created on the date of 2011.03.08., and at the time of 11:00 PM.

The location information included in the real-time information may indicate the location of corresponding real-time traffic information. For example, the location information may include a piece of information indicating whether the corresponding real-time traffic information is located at xxx section on the road A, or is located at xxx section on the road B. The location information may indicate a particular location by a method including at least one of the coordinate system and the link ID (identifier). The coordinate system, which may include a start coordinate and an end coordinate for more precise indication, is indicating a particular location by longitude and latitude. The link ID is a method indicating a road section, in which there is no divaricated path, between a node and another node, by a unique identifier. For example, the link ID may be designated by the standard node management system in accordance with ITS (Intelligent Transport System). The coordinate system and the link ID may be connected each other based on at least one of a coordinate, value and a mesh ID (identifier) (The mesh ID is a unique ID that classifies the map data into a plurality of divisions and designates each of the divisions).

It is apparent that the coordinate system and the link ID may be connected by other parameters.

The event information included in the real-time traffic is a traffic information generated on the date and time designated by the management information, and at the place designated by the location information. The event information may include at least one of; for example, moving speed information, moving time information, congestion information, weather information, accident information, and other various kinds of information relating to traffic conditions. The moving speed information may be the passing speed through a particular link (designated by the location information) at the real-time traffic information's generating time point (designated by the management information). The moving time information may be the time consumed for passing a particular link. The congestion information may be the degree of congestion at the real-time traffic information's generating time point. The weather information may be the weather of a particular link at the real-time traffic information's generating time point. Additionally, the accident information (also may be called by 'event information') is a special accident that may be a situation affecting traffic accidents, traffic crackdowns, and other traffic conditions. At this moment, the accident information may include a piece of information about the valid time of the accident. For example, if an accident is a traffic crackdown, the accident information may include a piece of information about the appointed traffic crackdown time as a valid time of the traffic crackdown.

As described above with reference to FIG. 2, the real-time traffic information may reflect real-time traffic information at a particular location.

The real-time traffic information server 10 may configure the real-time traffic information into the broadcast standard and transmit to the navigation 100 and the statistical traffic information server 50. The broadcast standard may include European DAB (Digital Audio Broadcasting) based on Eureka-147 [ETSI EN 300 401], ground wave or DMB (Digital Multimedia Broadcast) standard, DVB-T (Digital Video Broadcasting) standard, DVB-H (Digital Video broadcasting-Handheld) standard, MFLO (Media Forward Link Only), and other standards.

The statistical traffic information server 50 may create, by obtaining real-time traffic information from the real-time traffic information server 10, a statistical traffic information database. The statistical traffic information database may include plural pieces of statistical traffic information. Herein, the statistical traffic information may be history information about the traffic condition at a particular time and on a particular road. The statistical traffic information server 50 may create, by reading out management information, location information, and event information included in the provided real-time traffic information, statistical information about a particular section. The statistical traffic information will be described concretely with reference to FIG. 3.

Figure 3:
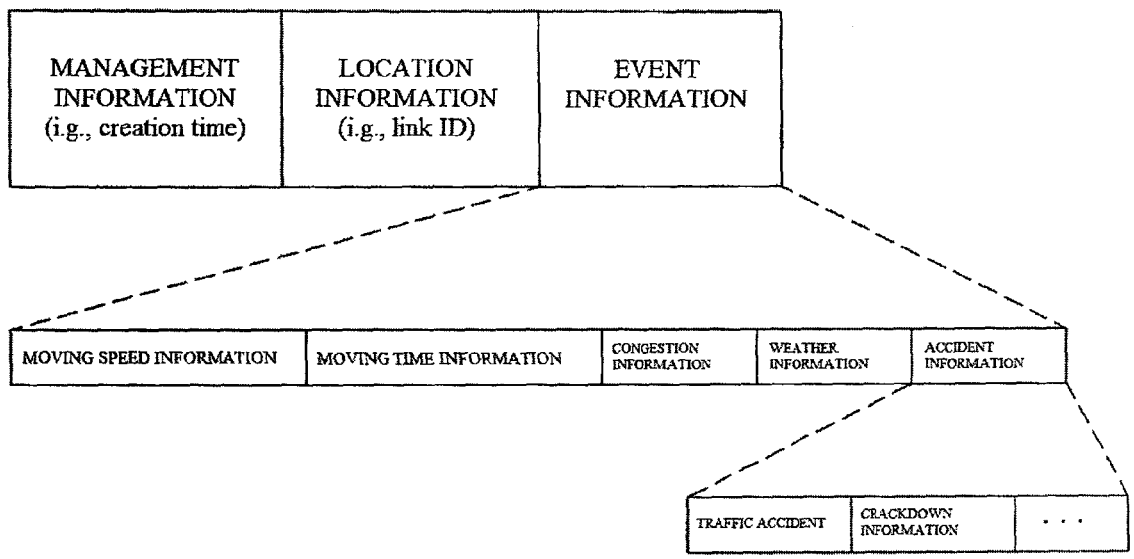
FIG. 3 illustrates statistical traffic information database according to an embodiment of the present disclosure.

FIG. 3 illustrates statistical traffic information database according to an embodiment of the present disclosure.

Referring to FIG. 3, each piece of information in the statistical traffic information database may include at least one of location information, collection condition, and statistical value.

The location information is for indicating a particular section of the road, and may be indicated by a method of the coordinate system or the link ID, as described for the real-time traffic information. From the following, for the convenience of description, the Link ID is assumed to be applied. The statistical traffic information server 50 may obtain a link ID from the location information included in the real-time traffic information. It should be apparent that even if the indicating methods of location information included in the real-time traffic information and the statistical traffic information are different from each other, by appropriate modification, the indicating methods may be adjusted.

The collection condition is for collecting the real-time traffic information, and may be a factor affecting the traffic condition. For example, the collection condition may include at least one of weather condition, each day's attribute condition, and time period condition. Other than that, the collection method may include various factors affecting the traffic condition.

The weathers according to the weather condition, as shown in FIG. 3, may be classified into serenity, cloud, rain, heavy rain, snow, heavy snow, etc. Although not shown, the rain may be classified more minutely according to the amount of rainfall. The weather condition is for considering the traffic condition which may be varied according to the weather.

The each day's attribute according to the each day's attribute condition may be classified into a weekday, a day before a holiday, a day after a holiday, a day before holidays, a day after holidays, the first day of holidays, the last day of holidays, etc. Although not shown, the each day's attribute may include special days, such as an entrance ceremony and a graduation ceremony. The each day's attribute is for considering the traffic condition which may be varied according to the each day's attribute.

For the time according to the time period condition, 24 hours may be classified by a predetermined standard, for example, by 30 minutes. The time interval, certainly, may be adjusted. For example, the time interval may be dense at rush hours, and may be broaden at daytime The statistical value may include history information corresponding to the location information, the weather condition, the each day's attribute condition, the time period condition. For example, the history information may include at least one of moving time, moving speed, and degree of congestion.

The statistical traffic information server 50 may create the statistical traffic information database based on the real-time traffic information. For example, the statistical traffic information server 50 may obtain a link ID from the obtained real-time traffic information, and may obtain a time period condition from the creation time information of the management information, and may obtain at least one of a weather condition and each day's attribute condition, and in addition, may obtain at least one of moving time, moving speed, and degree of congestion from the event information. Meanwhile, the statistical traffic information server 50, for configuring the statistical traffic information database, in case of information unobtainable from the real-time traffic information, may obtain the information from another server. The navigation 100 may collect statistical value information in a plurality of times. Hereby, the statistical traffic information server 50 may be able to obtain meaningful statistical value.

Referring to FIG. 3 as mentioned above, The statistical traffic information may provide history information such that: moving time, moving speed, and degree of congestion at a particular link ID, in a weekday (each day's attribute condition) in serenity (weather condition), at 0:00 1:00 time period (time period condition).

The statistical traffic information database may be updated if necessary, as the following: a case the average moving speed per time period is increasing because of road extension; in case some collection condition is added or deleted; in case the link ID is changed, added, or deleted.

The statistical traffic information server 50 may provide the created statistical traffic information database to the navigation 100. For example, the navigation 100 may receive the created statistical traffic information database from the statistical traffic information server 50 and store in the storage unit in the navigation 100. In addition, the statistical traffic information server 50, in case of receiving a request for statistical information about a particular path, may provide the requested statistical information about the particular path.

Additionally, the statistical traffic information server 50 may transmit the created statistical traffic information database to the real-time traffic information server 10. The real-time traffic information server may obtain estimated traffic information at a particular time and a particular location from the statistical traffic information database, and may transmit the real-time traffic information including the estimated traffic information to the navigation 100. Here, the real-time traffic information including the statistic information is supposed to be named as real-time information reflecting statistical traffic information. Thus, the real-time traffic information server may provide traffic information based on not only the real-time traffic information but also the statistical traffic information.

The statistical traffic information is described in the above, referring to FIG. 3. The navigation 100 will be described in the following.

The navigation 100 may be an electronic device proving route guidance. The navigation 100 may include various types of electronic devices including route guiding application such as, for example, smart phone, PDA (Personal Digital Assistant), tablet PC, Netbook, notebook, PC, etc. These are now more than an example of electronic device, therefore, all the electronic device implementing the technical spirit of the present disclosure may be the navigation. Hereinafter, referring to FIG. 4, a structure of the navigation will be described.

Figure 4:
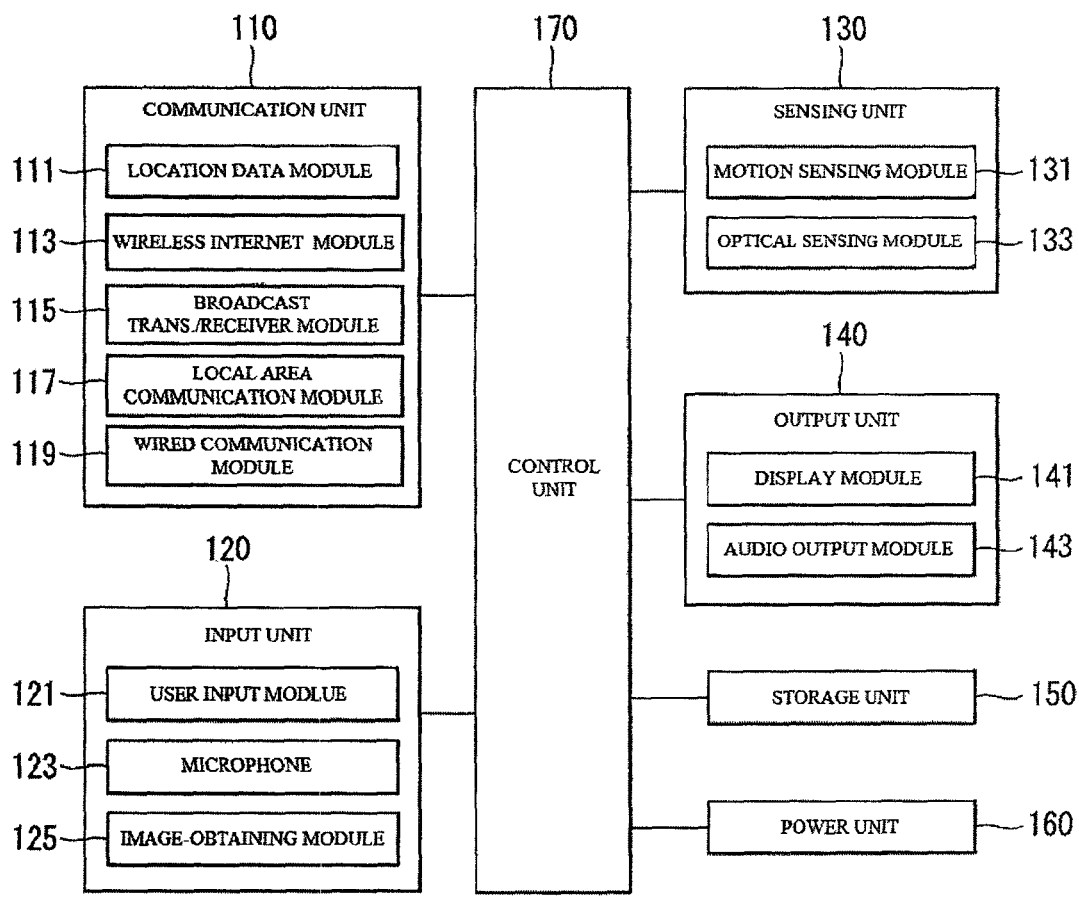
FIG. 4 is a block diagram illustrating a navigation according to an embodiment of the present disclosure.

FIG. 4 is a block diagram illustrating a navigation according to an embodiment of the present disclosure.

Referring to FIG. 4, a navigation 100 may include a communication unit 110, an input unit 120, a sensing unit 130, an output unit 140, a storage unit 150, a power unit 160, and a control unit 170. By the reason that the components illustrated in FIG. 4 are not essential, a general vehicle navigation may be configured to have more or less components.

Hereinafter, the above components will be reviewed in regular sequence.

The communication unit 110 may include at least one of module enabling communication between the navigation 100 and a communication system, or between the navigation 100 and a network in which the navigation is located, or between the navigation 100 and another electronic device. The navigation 100 may obtain the above-described real-time and/or statistical traffic information. For example, the communication unit 100 may include a location data module 111, a wireless internet module 113, a broadcast transmitter/receiver module 115, a local area communication module 117, a wired communication module 119, etc.

The location data module 111 identifies or obtains location data of the navigation 100. The location data may be obtained by a method using GNSS (Global Navigation Satellite System). GNSS is a navigation system indicating a location of a receiver terminal using radio signals from a satellite 20. Specific examples of GNSS may be GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The location data module 111 of the navigation 100 according to the embodiments of the present disclosure may obtain location information by receiving GNSS signals on service in the region where the navigation 100 is used. Especially, the location data obtained by the location data module 111 may include longitude and latitude.

The wireless internet module 113 connects to wireless internet, and obtains or transmits data. The wireless internet accessible through the wireless internet module 113 may be WLAN (Wireless LAN), Wibro (Wireless broadband), Wimax (World interoperability for microwave Access), HSDPA (High Speed Downlink Packet Access), etc.

The broadcast transmitter/receiver module 115 receives broadcast signals through a variety of broadcast system. The broadcast system may be DMBT (Digital Multimedia Broadcasting Terrestrial), DMBS (Digital Multimedia Broadcasting Satellite), MediaFLO (Media Foeward Link Only), DVBH (Digital Video Broadcast Handheld), ISDBT (Integrated Services Digital Broadcast Tereestrial), etc. The broadcast signals received through the broadcast transmitter/receiver module 115 may include the above-described real-time traffic information.

The local area communication module 117 is for communicating in a local area. The technology of local area communication may be Bluetooth, RFID (Radio Frequency Identification), IrDA (infrared Data Association), UWB (Ultra Wideband), ZigBee, NFC (near field communication), etc.

The wired communication module 119 provides an interface with another electronic device connecting to the navigation 100. For example, the wired communication module 119 may be a USB module communicating through a USB port.

The input unit 120 is for generating input data in order to control the navigation 100, and may generate input data by transferring physical input from outside into a particular electric signal. The input unit 120 may include a user input module 121, a microphone 123, and an image-obtaining module 125.

The user input module 121 receives control input from a user for controlling operation of the navigation 100. The user input module 121 may include a key pad, dome switch, touch pad (pressure type/capacitive), jog wheel, jog switch, etc.

The microphone 123 may receive voice of user and sound inside/outside of a vehicle.

The image-obtaining module 125 is for obtaining image inside/outside a vehicle. The image-obtaining module 125 may include a camera. The image-obtaining module 125 may not be a necessary component for the navigation 100. The navigation 100, if necessary, may connect to another device such as, for example, a vehicle black box, and with this electronic device, in place of the image-obtaining module 125, may be able to obtain image information.

The sensing unit 130 generates sensing signals for controlling operation of the navigation 100 by sensing current status of the navigation 100. The sensing unit 130 may include motion sensing module 131, optical sensing module 133, etc.

The motion sensing module 131 may sense motions of the navigation 100 in 3-dimension space. By combining motion data obtained through the motion sensing module 131 and location data obtained through the location dada module 111, more precise tracing for a vehicle with the navigation 100 may be possible.

The optical sensing module 133 is for measuring illuminance around the navigation 100. By using illuminance data obtained through the optical sensing module 133, the luminance of the display module 141 may be adjusted to the luminance of surroundings.

The output unit 140 is for outputting data of the navigation 100. The output unit 140 may include a display module 141, an audio output module 143, etc.

The display module 141 is for outputting visible data of the navigation 100. Meanwhile, it will be apparent that, if the display module 141 is a touch screen, the display module 141 may perform functions of the input module 120 and the output unit 140 at the same time, as described above.

The audio output module outputting auditive audio data. The audio out module 143 outputs audio data relating to the function of the navigation 100 (e.g., route guiding). The audio output module 143 may include receiver, speaker, buzzer, etc.

The storage unit 150 may store at least one of program for operating the navigation 100, map data for route guidance, the statistic traffic information database. The storage unit 150 may be installed inside the navigation 100 or detachable, and may include at least one storage medium in type of flash memory, hard disk, multimedia card micro type, card-type memory (e.g., SD or XD memory, etc.), RAM (Random Access Memory), SRAM (Static Random Access Memory), ROM (ReadOnly Memory), EEPROM (Electrically Erasable Programmable ReadOnly Memory), PROM (Programmable ReadOnly Memory), Magnetic Memory, Magnetic Disk, and Optical Disk. The navigation 100 may operate relating to web storage for the storage unit 150 on the internet.

The power unit 160 provides electrical power for operating each component of the navigation 100 or other devices connected to the navigation 100, by receiving electrical power inside/outside.

The control unit 170 generally controls operations of the navigation 100. Furthermore, the control unit 170 may output control signals for controlling other devices connected to the navigation 100. The control unit 170 may have other above-described modules (such as communication unit 110, input unit 120, sensing unit 130, output unit 140, storage unit 150, power unit 160, etc.) and an interface unit for transmitting/receiving information and/or control signals.

Above, referring to FIGS. 1 to 4, a description is given for system environment, real-time traffic information, statistical traffic information database, structure of the navigation, of the present disclosure.

Hereinafter, referring to FIGS. 1 to 4, a method for providing a path according to an embodiment of the present disclosure, will be described. However, referring to FIGS. 1 to 4 is only for the convenience of description. Therefore, the technical spirit of the present disclosure is not limited to a particular environment or a particular device.

The route guiding method according to an embodiment of the present disclosure may provide an optimal path in variable traffic conditions, by navigating a path in consideration of both real-time traffic information and statistical traffic information. Hereinafter, referring to FIGS. 5 to 14, the method for providing a path will be described.

Figure 5:
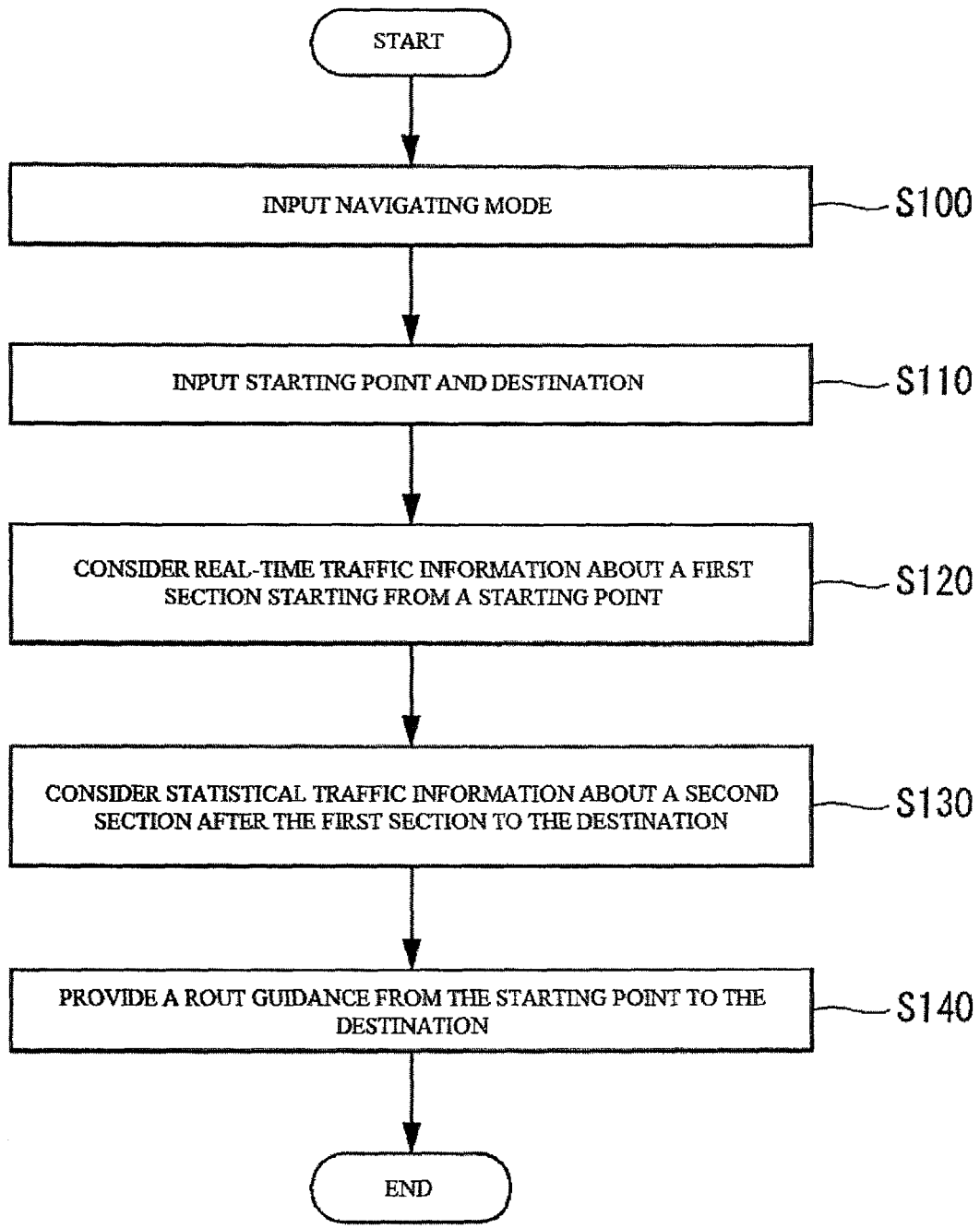
FIG. 5 is a flow chart illustrating a method for providing a path according to an embodiment of the present disclosure.
Figure 6:
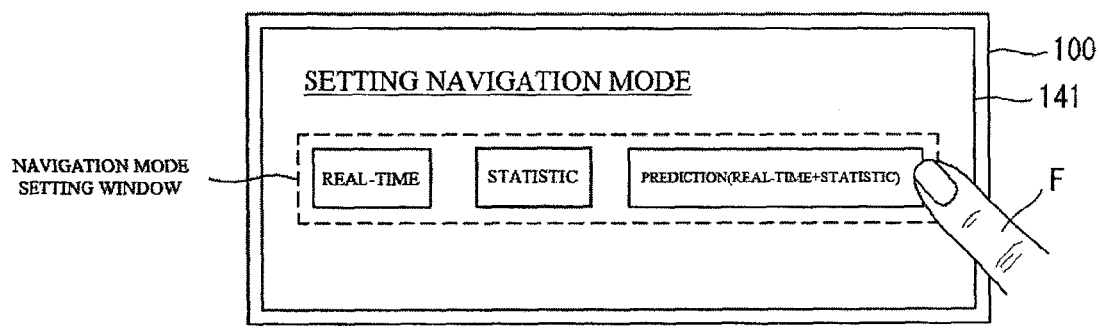
FIG. 6 illustrates a user interface according to an embodiment of the present disclosure.
Figure 7:
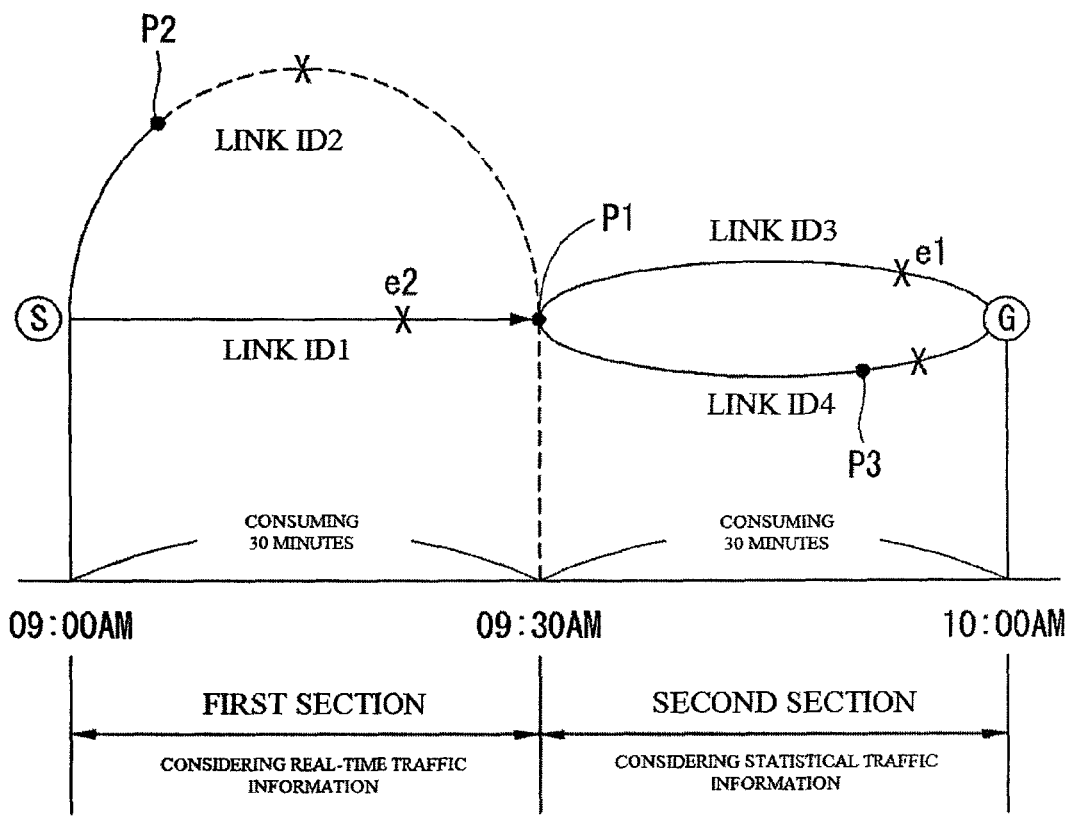
FIG. 7 illustrates a method for providing a path according to an embodiment of the present disclosure.
Figure 8:
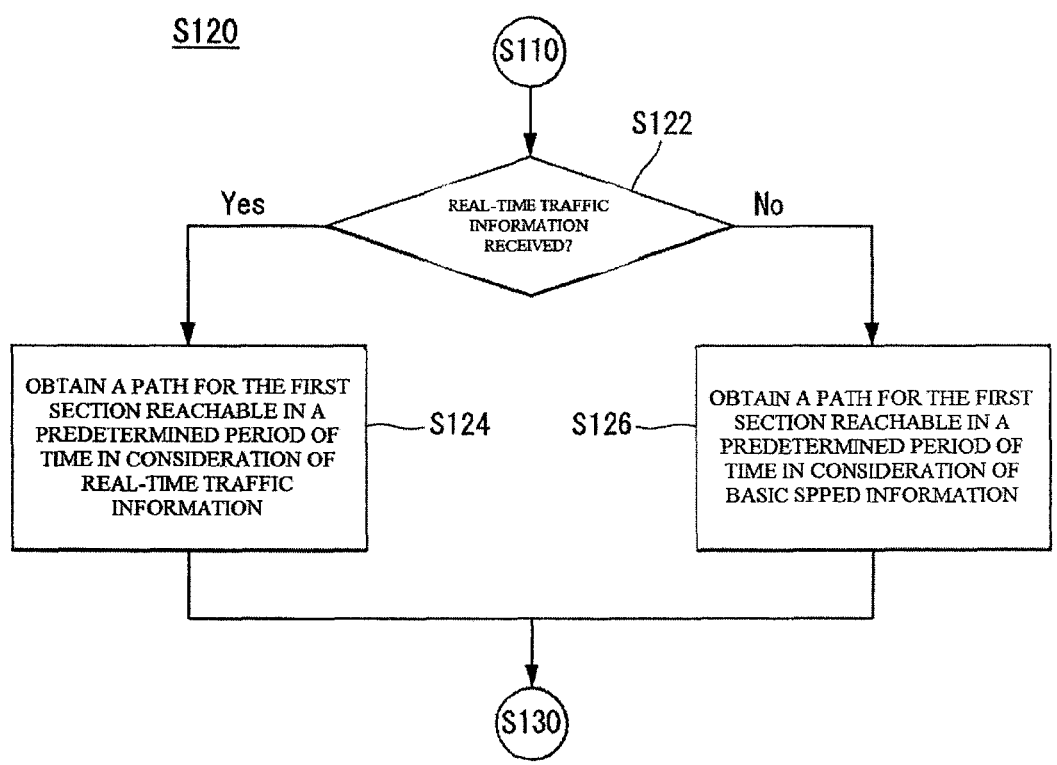
FIG. 8 is a flow chart illustrating a method for providing a path by considering real-time traffic information for a first section according to an embodiment of the present disclosure.
Figures 10, 11:
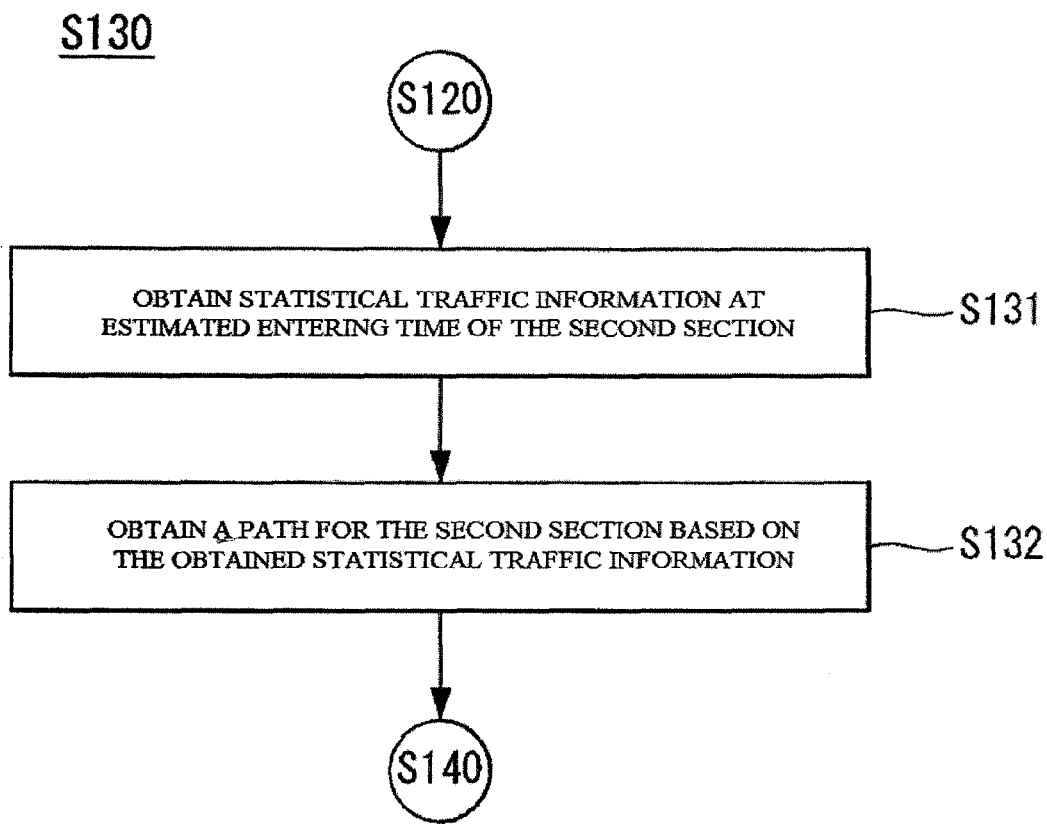
FIG. 10 illustrates a method for providing a path by considering statistical traffic information for a second section according to an embodiment of the present disclosure.
FIG. 11 illustrates an example of statistical traffic information for a second section according to an embodiment of the present disclosure.
Figure 12:
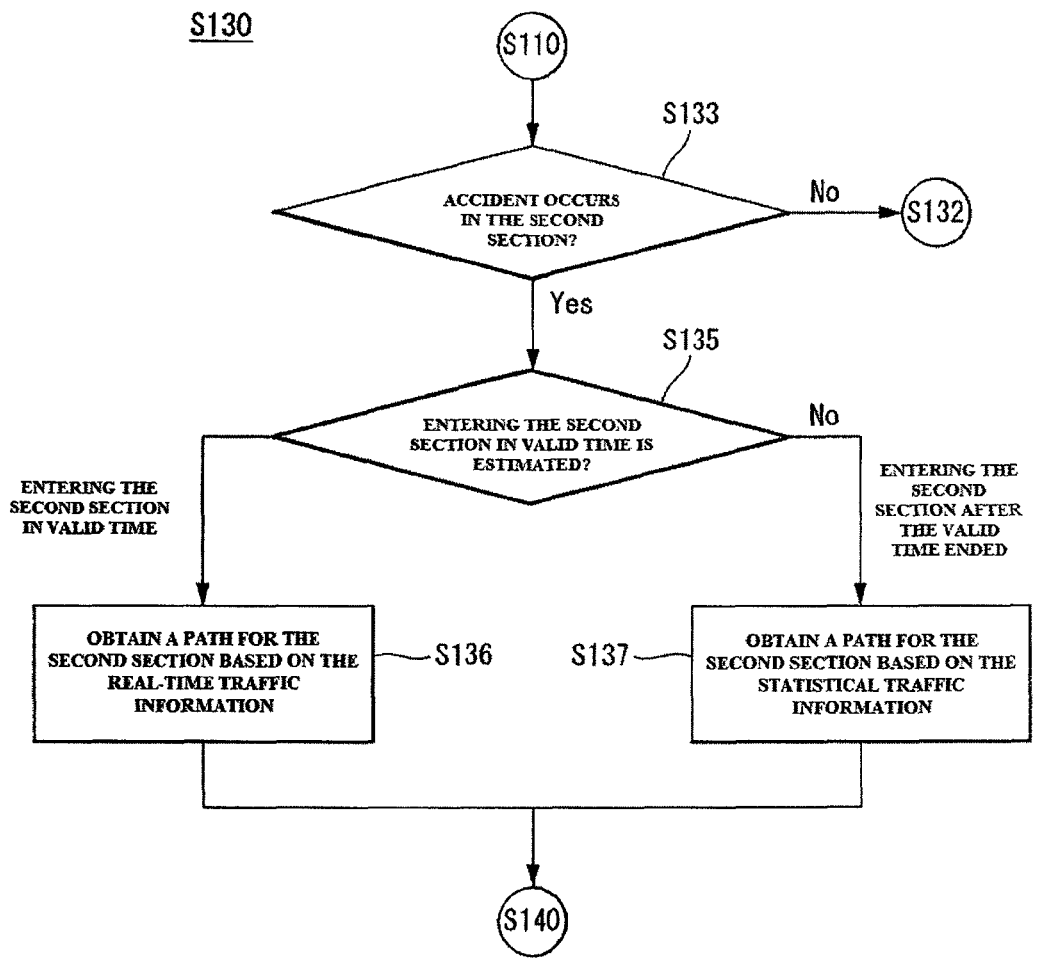
FIG. 12 illustrates a method for obtaining a path for a second section in case of accident information occurring according to an embodiment of the present disclosure.
Figure 13:
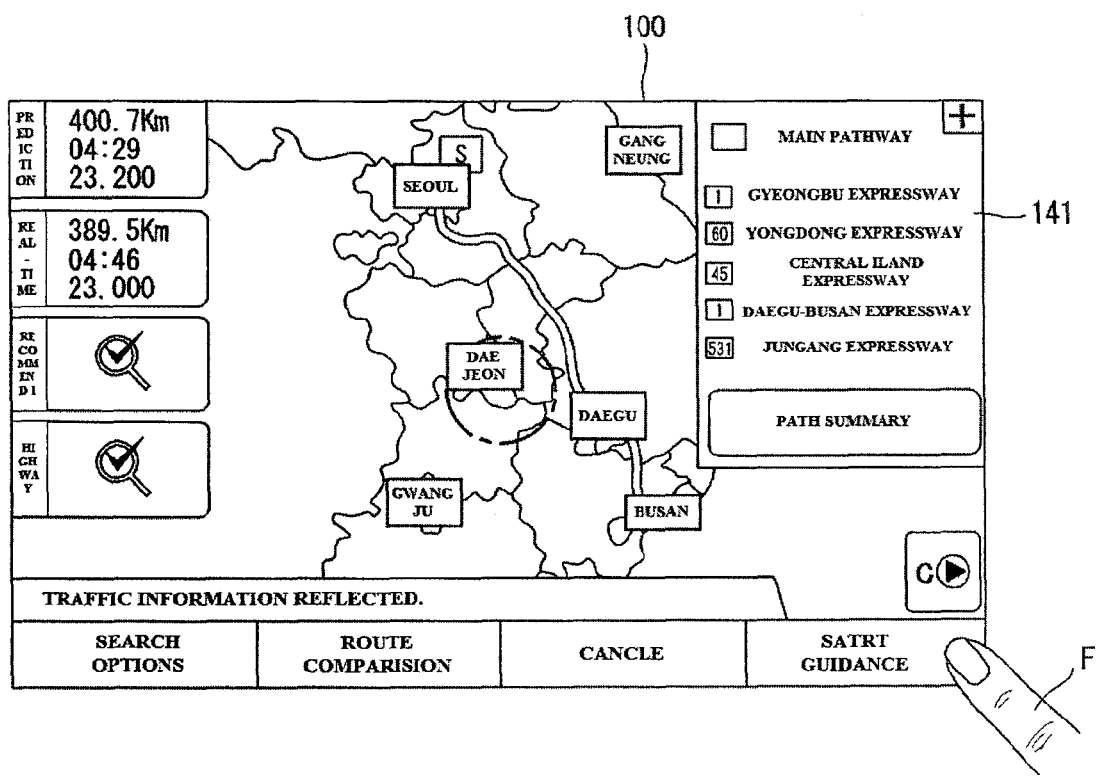
FIG. 13 illustrates a user interface according to an embodiment of the present disclosure.
Figure 14:
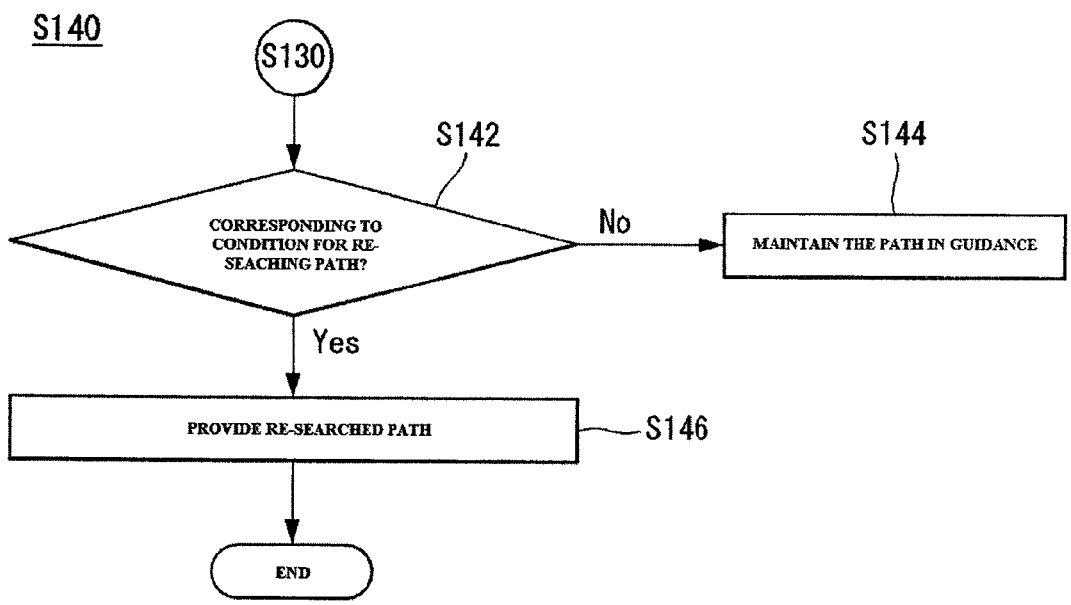
FIG. 14 illustrates a method for re-searching a path according to an embodiment of the present disclosure.

FIG. 5 is a flow chart illustrating a method for providing a path according to an embodiment of the present disclosure, and FIG. 6 illustrates a user interface according to an embodiment of the present disclosure, and FIG. 7 illustrates a method for providing a path according to an embodiment of the present disclosure, and, FIG. 8 is a flow chart illustrating a method for providing a path by considering real-time traffic information for a first section according to an embodiment of the present disclosure, and FIG. 9 illustrates an example of real-time traffic information and statistical traffic information for a first section according to an embodiment of the present disclosure, and FIG. 10 illustrates a method for providing a path by considering statistical traffic information for a second section according to an embodiment of the present disclosure, and FIG. 11 illustrates an example of statistical traffic information for a second section according to an embodiment of the present disclosure, and FIG. 12 illustrates a method for obtaining a path for a second section in case of an accident information occurring according to an embodiment of the present disclosure, and FIG. 13 illustrates a user interface according to an embodiment of the present disclosure, and FIG. 14 illustrates a method for re-searching a path according to an embodiment of the present disclosure.

FIG. 5 is a flow chart illustrating a method for providing a path according to an embodiment of the present disclosure.

Referring to FIG. 5, a method for providing a path according to an embodiment of the present disclosure, may include at least one of: setting a searching mode [S100]; receiving a starting point and a destination [S110]; considering real-time traffic information about a first section starting from the starting point to a predetermined point [S120]; considering statistical traffic information about a second section after the first section to the destination [S130]; and providing a path from the starting point to the destination [S140]. Hereinafter, each step will be described specifically.

The navigation 100 may set up a search mode [S100].

Search mode is a method for searching for a path. For example, the search mode may include at least one of a real-time traffic information mode providing a path based on real-time traffic information, a statistical traffic information mode providing a path based on statistical traffic information mode, and a predicted traffic information mode providing a path in consideration of both real-time traffic information and statistical traffic information. Additionally, the search mode may further include modes such as smallest time, shortest distance, smallest cost, etc.

The navigation 100 may output a user interface for receiving selection of the search mode through the display unit 140. FIG. 6 illustrates a user interface according to an embodiment of the present disclosure.

The navigation 100, as shown in FIG. 6, may output a user interface including a navigation mode setting window for receiving selection of search mode. The user may select the prediction mode among real-time, statistic, and prediction modes.

The S100 for receiving selection of search mode, may be performed, not only before S100 for receiving a starting point and a destination, but also after S110.

It will be apparent that the search mode may be set automatically without any action of a user.

Hereinafter, a case the navigation 100 receives a selection of the prediction mode will be described.

The navigation may receive a starting point and a destination [S110].

The navigation 100, as shown in FIG. 7, may receive a selection of S point as a starting point and a selection of G point as a destination. For example, the navigation 100 may obtain information by know means such as user input module 121, microphone 123, etc.

Hereinafter for the convenience of description, a case the navigation 100 receives a starting point and a destination on a weekday, at 09:00, in weather of serenity, is assumed. This situation may be used for obtaining the most corresponding information from the statistical information database in next steps. Specific means for obtaining the statistical traffic information will be described in the following.

The navigation 100 may consider the real-time traffic information for a first section starting from the starting point [S120].

For specific description of S120, FIG. 8 will be referred.

FIG. 8 is a flow chart illustrating a method for providing a path by considering real-time traffic information for a first section according to an embodiment of the present disclosure. According to an embodiment of the present disclosure, the navigation 100 configures a path for the first section reachable in a predetermined time period in accordance with the real-time traffic information.

Referring to FIG. 8, the method for configuring a path for the first section according to an embodiment of the present disclosure may include at least one of: determining if the real-time traffic information is received [S122]; in case of receiving the real-time traffic information, obtaining the path for the first section reachable in a predetermined time period in accordance with the real-time traffic information [S124]; and in case of not receiving the real-time traffic information, obtaining the path for the first section reachable in a predetermined time period in accordance with basic speed information [S126]. Hereinafter, each step will be described specifically.

The navigation 100 determines if the real-time traffic information is received [S122].

In S100, the navigation 100 may listen to the real-time traffic information obtainable at the time point of 09:00 AM, when the request for navigating is received. Here, the navigation may or may not be able to obtain the real-time traffic information. For example, if the navigation 100 is in shaded area for communication, it may not be able to obtain the real-time traffic information.

The navigation 100, in case of receiving the real-time traffic information, may obtain a path for the first section reachable in a predetermined time period [S124].

The navigation 100 may obtain the real-time traffic information through the broadcast receiver module 115.

Here, the predetermined time is, a time that the real-time traffic information is valid meaningfully as real-time. For example, the real-time traffic information generated at 09:00 AM may be an imprecise piece of data after 30 minutes, because the traffic condition may vary in 30 minutes. More specifically referring to FIG. 7, The real-time traffic information generated at 09:00 AM may be valid from the starting point to the position P1. However, when the vehicle arrives at the position P1, for example, 30 minutes may be consumed. Therefore, the real-time traffic information from the position P1 to the destination generated at 09:00 AM may not be valid when the vehicle actually arrives at the point P1. Therefore, according to an embodiment of the present disclosure, a first section is set for the starting point to a particular point reachable in a predetermined time period from the starting point, and for the first section, the real-time traffic information may be considered. In addition, after the first section, the statistical traffic information may be considered. Means for considering the statistical traffic information will be described later.

The predetermined time period may be changed by user setting. Hereinafter for the convenience of description, the predetermined time period is assumed as 30 minutes. In this case, the first section is assumed to be a section from the starting point S to the point reachable in 30 minutes.

The control unit 170 of the navigation 100 selects an optimal path among a plurality of paths form the starting point P to the point reachable in 30 minutes. For this, the navigation 100 may obtain a link ID for reaching the destination from the starting point from map data stored in the storage unit 150 of the navigation 100. Here, the link ID for the path to the destination from the starting point may be at least one. For example, as shown in FIG. 7, for configuring a path from the starting point S to the destination G, link ID1 and link ID2 may be considered. Hereinafter for the convenience of description, a case that the starting point S and the position P1 shown in FIG. 7 is designated for the start node and end node of the link ID1 and link ID 2 respectively, is assumed.

The navigation 100 may select an optimal path between the link ID1 and the link ID2 in consideration of the real-time traffic information. For this, the navigation 100 may obtain the real-time traffic information for the link ID1 and link ID2 for the start time 09:00. Referring to FIG. 9(a), the real-time traffic information is: for the link ID1, moving speed is 60 km/h, and moving time is 30 minutes; for the link ID2, moving speed is 10 km/h, and moving time is 90 minutes.

In this case, the control unit 170 of the navigation 100 may select the farthest path reachable in the predetermined time period (30 minutes). Referring to FIG. 7, in case the link ID1 is selected for the path, the reachable point in 30 minutes is P1, and in case the link ID2 is selected for the path, the reachable point in 30 minutes is P2.

Meanwhile, in case of not receiving the real-time traffic information, the navigation 100 may obtain a path for the first section in consideration of the statistical traffic information [S126].

In case of not receiving the real-time traffic information, the navigation 100 may consider basic speed information for obtaining a path for the first section.

The basic speed information herein is a moving speed predetermined according the type of roads. The basic speed information may be included in the map data of the storage unit 150 and stored. For example, as shown in FIG. 9(b), the map data may include the basic speed information according the type of roads such as (link ID1, 80 km/h(basic speed information)), (link ID2, 60 km/h(basic speed information)).

In case of not receiving the real-time traffic information, the navigation may configure a path for the first section based on the basic speed information. Referring to FIG. 9(b), the navigation may determine that the basic speed information of the link ID1 and the link ID2 are 80 km/h and 60 km/h respectively. The navigation 100, by obtaining the length information of the link ID1 and link ID2, in consideration of the basic speed information, may obtain the consumed time for moving on the link ID1 and the link ID2. For the convenience of description, the length of the link ID1 and the link ID2 are assumed to be the same. In this case, the navigation 100 may select the link 1 having shorter estimated time consumption, for configuring the path for the first section, because the basic speed of the link ID 1 is faster than the basic speed of the link ID 2 and the section length of the link ID1 and the link ID2 are the same.

Therefore, according the embodiment described with reference to FIG. 8, the navigation 100 may select the path for the first section. Hereinafter, returning to FIG. 5, S130 will be described. A case the link ID1 is selected as the path for the first section is assumed.

Referring to FIG. 5, the navigation may consider the statistical traffic information for the second section after the first section to the destination [S130].

As described above, the navigation 100 configures the optimal path by obtaining the path for the first section in consideration of the real-time traffic information, and by obtaining the path for the second section in consideration of the statistical traffic information.

S130 will be described specifically with reference to FIG. 10.

FIG. 10 illustrates a method for providing a path by considering statistical traffic information for a second section according to an embodiment of the present disclosure.

Referring to FIG. 10, a method for configuring a path for the second section according to an embodiment of the present disclosure, includes: obtaining statistical traffic information at the expected entering time point of the second section [S131]; and obtaining the path for the second section based on the obtained statistical traffic information [S132]. Hereinafter, each step will be described specifically.

The navigation 100 may obtain the statistical traffic information at the expected entering time point of the second section [S131].

The expected entering time point of the second section may be the expected arriving time point at the end point of the first section. As shown in FIG. 7, the expected entering time point of the second section may be 09:30 AM, which the predetermined 30 minutes is added to the start time 09:00 AM.

The navigation 100 may obtain a candidate path for the second section. The second section is a section from the end point of the first section to the destination. Referring to FIG. 7, for example, the second section is a section from P1 to G. The navigation 100 may obtain the link ID3 and the link ID4 as candidates for the second section path, as shown in FIG. 7.

The navigation 100 may obtain the statistical traffic information for the link ID3 and the link ID 4 at the time point of 09:30 AM. In order to obtain more precise statistical traffic information, the navigation 100 may further obtain at least one of each day's attribute condition and weather condition, in addition to the expected entering time point of the second section. As assumed above, the attribute of the day is a weekday. In addition, the weather condition of the second section will be assumed as rain. As shown in FIG. 11, the navigation 100 may obtain the statistical value information of the link ID 3 and the link ID 4 respectively, in case the weather condition is rain and the day's attribute is a weekday at 09:30 AM. By this, the navigation 100 may obtain the statistical traffic information most similar to the traffic condition at the expected entering time point of the second section. For example, referring to FIG. 11, at the expected entering time point of the second section, the statistic value of the link ID3 is 40 km/h of average moving speed, 30 minutes of average moving time. The statistic value of the link ID4 is 20 km/h of average moving speed, 60 minutes of average moving time.

The navigation 100 may subdivide the second section into a plurality of subsections. For example, the navigation 100, in case the expected passing time of the second section is longer than the predetermined time period, may classify the second section into a plurality of subsections and use the statistic traffic information of the estimated entering time of each subsection.

More precisely referring to FIG. 11, the average moving time of the link ID 4 is 60 minutes. In this case, the average moving time becomes longer than the predetermined 30 minutes. Therefore, the navigation 100 classifies the link ID4 into subsections of link ID4-1 and link ID4-2. In succession, the navigation 100 considers the statistical traffic information at 09:30 AM which is the estimated entering time for the link ID4-1, and considers the statistical traffic information at 10:00 AM which is the estimated entering time for the link ID4-2.

By this, the navigation 100, by considering more precise statistical traffic information for each subsection in the second section, may provide more precise estimated time. Hereinafter for the convenience of description, the statistical traffic information will be considered without dividing the link ID4 into a plurality of subsections.

The navigation 100 may obtain a path for the second section based on the statistical traffic information [S132].

Referring to FIG. 11, the navigation 100 may determine that, based on the statistical values, moving through the link ID 3 is faster than moving through the link ID 4. Therefore, the navigation 100 may select the link ID3 as a path for the second section.

By this, the navigation 100 may configure the path for the second section considering the real-time traffic information at 09:30 AM which reflects more precise traffic condition rather than the real-time traffic information at 09:30 AM.

The navigation 100 may configure the path by extending from the link ID1 selected for the first section to the link ID2 selected for the second section.

Meanwhile, according to the present embodiment, for performing step S130 shown in FIG. 5, accident information may be further considered. Hereinafter, referring to FIG. 12, the case of the accident information occurring will be described specifically.

FIG. 12 illustrates a method for obtaining a path for a second section in case of accident information occurring according to an embodiment of the present disclosure.

In the embodiment described with reference to the flow chart in FIG. 10, the statistical traffic information is considered. However, in case an accident occurs in the second section, an error may be occurred if the statistical traffic information is unconditionally applied. For solving this problem, an embodiment of the present disclosure provides the following technical solution.

Referring to FIG. 12, a method for configuring a path for the second section in case of an accident information occurring in accordance with an embodiment of the present disclosure, includes at least one of: determining if an accident occurs in the second, section [S133]; in case of obtaining a valid time, determining if the vehicle is expected to enter the second section in the valid time [S135]; In case the vehicle is expected to enter the second section in the valid time, obtaining the path for the second section in consideration of the real-time traffic information [S136]; and in case the vehicle is expected to enter the second section after the valid time is over, obtaining the path for the second section in consideration of the statistical traffic information [S137]. Hereinafter, each of the steps will be described specifically.

The navigation 100 may determine if an accident occurs in the second section [S133].

The accident herein is, as described before, a special accident which affects the traffic condition.

The navigation 100 may determine if an accident occurs in the second section. For example, the navigation 100 may listen to the real-time traffic information for the second section, at the time point of searching the path in S110 in FIG. 5 (e.g., 09:00 AM). The navigation 100 may determine if the listened real-time traffic information includes accident information. Therefore, the navigation 100 may determine if an accident occurs in the second section.

Returning to FIG. 7, the navigation, in searching for the path from the starting point S to the destination G at 09:00 AM, may determine that an accident occurs at point e1 of link ID4 in the second section. The navigation 100 determines if the vehicle is expected to enter the second section in valid time of the accident [S135].

For this, the navigation 100 determines valid time of the accident occurred in the second section.

The valid time of accident can be duration time of the accident. For example, in case the accident is a traffic crackdown, the valid time of the accident is the time that the traffic crackdown is performed.

In the previous embodiment described with reference to FIG. 2, it is described that the real-time traffic information may include accident information and valid time of accident. Therefore, the navigation 100 may obtain accident information and valid time of the accident. In addition, it will be apparent that the navigation 100 may obtain accident information and valid time of the accident from other sources than the real-time traffic information. The reason for determining if the vehicle is expected to enter the second section in the valid time is, to determine if the accident affects the path configuration. Referring to FIG. 7, the expected entering time of the second section is 09:30 AM. Even if an accident occurs in the second section, it may not affect the path configuration in case the accident is over before 09:30 AM which is the expected entering time of the second section.

In the result of determination in step S135, in case of determining that the vehicle is expected to enter the second section in the valid time of the accident, the navigation 100 may obtain the path for the second section according to the real-time traffic accident [S136].

The navigation 100 may determine that the accident occurred at position e1 in the second section continues after 09:30 AM (the expected entering time of the second section). In this case, like the embodiment described previously with reference to FIG. 10, if the navigation 100 considers the statistical traffic information for the link ID3 in the second section, the information may differ from the real traffic condition varied by the accident.

Therefore, the navigation 100 may obtain the path for the second section considering the real-time traffic information rather than the statistic traffic information. The considering of real-time traffic information for the second section is, to consider the real-time traffic information for the link ID3 (the section in which the accident occurs) obtained at 09:00 AM (the time point of path searching). The navigation 100 may configure the path by selecting the link having shorter arriving time to the destination, after comparing the real-time traffic information for the link ID3 (the section in which the accident occurs) obtained at 09:00 AM (the time point of path searching) and the link ID4 (the section in which the accident does not occur) obtained at 09:30 AM (the expected entering time of the second section).

By this, the navigation 100 may consider, in case an accident occurs in the second section and the accident continues after the expected entering time of the second section, in order to reflect the traffic condition precisely, the real-time traffic information.

Meanwhile, in the result of determination in step S135, in case of determining that the vehicle is expected to enter the second section after the accident is over, the navigation 100 may obtain the path for the second section considering the statistic traffic information [S137].

The navigation 100 may determine that the accident occurred at position e1 in the second section is over before 09:30 AM (the expected entering time of the second section). In this case, the accident occurred in the second section is highly probable to make no effect the traffic condition after 09:30 AM (the expected entering time of the second section). Therefore, according to the embodiment described previously with reference to FIG. 10, the navigation 100 may obtain the path for the second section considering the statistical traffic information.

In the above, according to the embodiment described previously with reference to FIG. 10, the navigation 100 may provide more precise path recommendation even if an accident occurs in the second section. Hereinafter, returning to FIG. 5, step S140 will be described.

Returning to FIG. 5, the navigation 100 may provide the path from the starting point to the destination.

As described in the previous embodiments, the navigation 100 may configure a path from the starting point to the destination in the shortest time period considering the real-time traffic information and the statistical traffic information. Referring to FIG. 7, the navigation 100 may provide the path configured with the link ID1 and the link ID3 for the path from the starting point S to the destination G. Passing time of the link ID1 is 30 minutes considering the real-time traffic information, and passing time of the link ID3 is 30 minutes considering the statistical traffic information. In case of passing through the link ID1 and link ID3 for reaching the destination G from the starting point S, it takes 1 hour, which is assumed as the shortest reaching time comparing to other paths.

The navigation 100 may provide a path configured with the link ID1 and the link ID3. The navigation 100 may out, as shown in FIG. 13, an overall summary map for the searched path. The driver may perceive the entire path at a glance. In addition, when the user select the icon "start guidance" shown at the right bottom in FIG. 13, the navigation may start navigating the selected path.

In case some particular events occur during the route guidance, the navigation 100 may re-search the path. Hereinafter, an embodiment that the navigation 100 re-searches the path will be described more specifically with reference to FIG. 14.

FIG. 14 illustrates a method for re-searching a path according to an embodiment of the present disclosure.

During the route guidance (While Driving), the traffic condition may vary. In order to provide the optimal path corresponding to the varying traffic condition, the navigation 100 may re-search the path.

Referring to FIG. 14, a re-searching for the path according to an embodiment of the present disclosure includes: determining if overall condition for route guidance is corresponding to a predetermined condition for re-searching [S142]; if overall condition for route guidance is not corresponding to a predetermined condition for re-searching, maintaining the current path in guidance [S144]; and if overall condition for route guidance is corresponding to a predetermined condition for re-searching, providing a re-searched path [S146]. Hereinafter, each of the steps will be described specifically.

The navigation 100 may determine if overall condition for route guidance is corresponding to a predetermined condition for re-searching [S142].

The predetermined condition for re-searching may be various. For example, the condition for re-searching may be: a case of predetermined cycle; a case that the statistical traffic information for the second section at the time point of path searching and the real-time traffic information in route guidance are different each other; a case that an accident occurs on the driving path while driving; a case of receiving a user request; etc. Hereinafter, each of the conditions for re-searching will be described specifically.

In case of predetermined cycle, the navigation 100 may re-search the path by the predetermined cycle. For example, the predetermined cycle may be a value inputted by a user or a default value, and for example, may be 25 minutes.

Another example of the predetermined condition for re-searching, a case that the statistical traffic information for the second section at the time point of path searching and the real-time traffic information in route guidance are different each other, will be described in the following. Previously referring to FIG. 7, the navigation 100 determines that the expected time consuming of the link ID3 is 30 minutes (refer to FIG. 11). The navigation 100 may obtain the real-time traffic information for the link ID3 at the time of entering the link ID3 or at the expected time of entering the link ID3. In case the entering time of the link ID3 is 09:30 AM, the navigation 100 may obtain the real-time traffic information for the link ID3 at 09:30 AM. By this, the navigation 100 may compare the statistic traffic information for the expected time point of entering the second section and the real-time traffic information at the time point of entering the second section or at the expected time point of entering the second section.

The navigation 100 may determine if the result value of the comparing is more than the predetermined standard value. Here, the predetermined standard value may be, for example, 20 minutes, which may be set by a user's decision. Thus, the navigation 100 may determine if the difference between the moving time based on the statistic traffic information for the expected time point of entering the second section and the moving time based on the real-time traffic information at the time point of entering the second section or at the expected time point of entering the second section is more than or equal to 20 minutes. In the result of the above comparison, in case the result value is more than or equal to the predetermined standard value, the difference between the statistical traffic information and the real-time traffic information is big. Therefore, the navigation 100 may determine to re-search the path. Otherwise, in case the result value is smaller than the predetermined standard value, the difference between the statistical traffic information and the real-time traffic information is small. Therefore, the navigation 100 may determine to maintain the path in guidance. For example, the navigation 100 may determine, for the link ID3 at 09:30 AM, that 30 minute is consumed considering the statistical traffic information. However, the navigation 100 may determine, for the link ID3 at 09:30 AM, that 1 hour is consumed considering the real-time traffic information. In this case, the difference is 30 minutes. Therefore, the navigation 100 may determine that the difference is bigger than the predetermined standard value of 20 minutes.

Another example of the predetermined condition for re-searching, a case that an accident occurs on the driving path while driving, will be described in the following. The navigation 100 may, while navigating a path including the link ID1 and the link ID3, obtain a piece of information that an accident occurs between the vehicle and the destination. Especially, the navigation may obtain a piece of information that an accident occurs in the second section (in which the statistical traffic information is considered), between the vehicle and the destination. For example, the navigation 100 may determine that an accident occurs in the ID section through the real-time information for the link ID3. In this case, the expected passing time for the link ID3 generated when configuring the path becomes incorrect by the accident occurred during the driving. Therefore, the navigation 100 may need to re-obtain the path.

Above, the conditions for re-searching the path are described.

The navigation 100 may maintain the current path in guidance, if overall condition for route guidance is not corresponding to a predetermined condition for re-searching [S144].

Thus, the navigation 100 may maintain the current path in guidance, if the navigation 100 determines that overall condition for route guidance is not corresponding to the above-enumerated conditions for re-searching.

Meanwhile, the navigation 100 may re-search the path in guidance, if overall condition for route guidance is corresponding to a predetermined condition for re-searching [S146].

For example, the navigation 100 may re-search the path, in case at least one of that: a predetermined cycle arrives; the comparison result value between the statistical traffic information for the second section and the real-time traffic information for the second section are bigger than a predetermined standard value; an accident occurs on the driving path.

Here, the navigation 100 may re-search the path, in case a predetermined cycle arrives and the comparison result value between the statistical traffic information for the second section and the real-time traffic information for the second section are bigger than a predetermined standard value, according to the embodiment described with reference to FIG. 8 and FIG. 10. In addition, the navigation 100 may re-search the path, in case an accident occurs on the driving path, to the embodiment described with reference to FIG. 12.

The navigation 100 may output various user interfaces for re-searching the path. For example, the navigation 100 may output a user interface for determining if the path re-searching would be initiated, in case of corresponding to the conditions for re-searching. Here, the navigation may output the reason for re-searching together. In addition, if the reason for re-searching is an accident occurred on the driving path, the navigation 100 may output information about the accident, for example, information about at least one of the location where the accident occurs, the time when the accident occurs, and the valid time of the accident. In addition, if the navigation 100 obtains a new path faster than the current path by the path re-searching, the navigation 100 may output a user interface questioning if navigation of the re-searched new path would be initiated.

According to the embodiment previously described with reference to FIG. 14, the navigation 100 may provide an optimal path by reflecting the constantly varying traffic conditions, even in the situation that the vehicle is on driving.

As above, according to embodiments described with reference to FIGS. 5 to 14, the navigation 100 may provide the shortest time path. In addition, the navigation 100 may provide the shortest time path even in the situation that an accident occurs. In addition, the navigation 100 may provide the optimal path constantly, by re-reaching the path in order to reflect the traffic conditions varying constantly.

The various embodiments herein may be carried out respectively or may be carried out in combination. In addition, steps configuring each embodiment may be carried out in combination with other steps configuring other embodiments.

In addition, in case the navigation 100 receives a starting point and a destination, the navigation 100 may obtain a path through the map data stored in the navigation 100. Otherwise, in case the navigation 100 receives a starting point and a destination, the navigation may receive a path from a server outside as a response, by transmitting the starting point and the destination received. That is, by a concept of Cloud Computing, the navigation 100 may provide interface functions only, and the computing of the information may be performed by a server outside. Hereby, the navigation 100 may guide a path based on result values computed by a server outside.

In addition, the navigation 100, for considering the statistical traffic information, instead of using the statistical traffic information stored in the storage unit 150, using the real-time traffic information reflecting the statistical traffic information, may configure a path.

Various embodiments of the present disclosure may be implemented by computer readable media. The media may include, for example, a single structure or a combined structure of program code, data file, data structure for implementing an embodiment of the present disclosure. The example of the media may include magnetic media, optical recording media such as CD and DVD, ROM, flash memory, etc. The example of program code may include not only machine language code generated by compiler, but also high-level programming language code executable by computer using interpreter.

The above-described various embodiments of the present disclosure may be substituted, or transformed, or modified by persons who skilled in the art of the present disclosure, within the limit of the technical spirit of the present disclosure. Therefore, the scope of right for the present disclosure is not limited by those described embodiments and drawings. In addition, the various embodiment described herein are not only applicable limitedly, but also to be in a diversity of modification. These modifications may also be in the scope of right for the present disclosure.

SYMBOLS IN THE DRAWINGS

10: real-time traffic information server
50: statistical traffic information server
100: navigation
170: control unit

What is claimed is:

1. An electronic device, comprising:
an output unit; and
a control unit for providing a path from a starting point to a destination through the output unit by:
considering real time traffic information about a first section, wherein the first section starts at the starting point and continues to a predetermined point; and
considering statistical traffic information about a second section, wherein the second section starts at the predetermined point and continues to the destination.

2. The device of claim 1, wherein
the control unit providing the path by considering, for the second section, statistical traffic information of an expected time point to enter the second section.

3. The device of claim 1, wherein
the path is a smallest time-consuming path from the starting point to the destination.

4. The device of claim 1, wherein
the control unit obtaining statistical traffic information about the second section, based on at least one of each day s attribute condition and weather condition.

5. The device of claim 1, wherein
the control unit configuring a path for the first section, considering real-time traffic information about start-time-point at the starting point.

6. The device of claim 1, wherein
the predetermined point is a point reachable from the starting point in a predetermined period of time, considering the real-time traffic information.

7. The device of claim 1, wherein
the control unit providing the path by considering, in case of failure to obtain the real-time traffic information, statistical traffic information about the first section.

8. The device of claim 1, wherein
the control unit providing the path by considering, in case there exists an accident in the second section, at least one of real-time traffic information and statistical traffic information about the second section in accordance with a valid time of the accident.

9. The device of claim 8, wherein
the control unit determining if the accident exists in the second section through real-time traffic information at the time point of searching the path.

10. The device of claim 8, wherein
the control unit providing the path by considering, in case of determining that the accident in the second section will be finished before an expected entering time of the second section, statistical traffic information for the second section.

11. The device of claim 8, wherein
the control unit providing the path by considering, in case of determining that the accident will be continued after an expected entering time of the second section, real-time traffic information for the second section.

12. The device of claim 1, wherein
the control unit outputting an overall summary map including the starting point, the destination, and the path, through the output unit.

13. The device of claim 1, wherein
the control unit, in case of corresponding to a predetermined condition for re-searching, while providing route guidance according to the path, re-searching for a path.

14. The device of claim 13, wherein
the predetermined condition for re-searching is at least one of:
a case that a predetermined cycle for re-searching arrives;
a case that a difference between statistical traffic information about the second section at an expected entering time of the second section and real-time traffic information about the second section at an expected entering time of the second section is equal to or more than a predetermined standard value; and
a case that an accident occurs between a current position of a vehicle and the destination.

15. The device of claim 14, wherein
in case the accident occurs, the control unit outputting information about the accident through the output unit.

16. The device of claim 13, wherein
the control unit outputting a user interface questioning if the re-searched path would be navigated through the output unit.

17. An operating method of an electronic device, comprising:
receiving a starting point and a destination; and
providing a path from the starting point to the destination through an output unit, by:
considering real time traffic information about a first section, wherein the first section starts at the starting point and continues to a predetermined point; and
considering statistical traffic information about a second section, wherein the second section starts at the predetermined point and continues to the destination.

18. The method of claim 17, the providing comprising:
providing the path by considering, for the second section, statistical traffic information of an expected time point to enter the second section.

19. The method of claim 17, wherein
the path is a smallest time-consuming path from the starting point to the destination.

20. The method of claim 17, wherein
the statistical traffic information considered for the second section is obtained based on at least one of each day's attribute condition and weather condition.

21. The method of claim 17, further comprising:
configuring a path for the first section in consideration of real-time traffic information about start-time-point at the starting point.

22. The method of claim 17, wherein
the output unit outputs an overall summary map including the starting point, the destination, and the entire path.

23. The method of claim 17, further comprising:
in case of corresponding to a predetermined condition for re-searching, re-searching for a path.

24. The method of claim 23, further comprising:
outputting a user interface questioning if the re-searched path would be navigated through the output unit.

25. The method of claim 17, further comprising:
in case an accident occurs between a current position of a vehicle and the destination while navigating the path, outputting information about the accident through the output unit.

26. A non-transitory computer readable recording medium storing a program for executing the method of claim 17.

* * * * *